US012785839B2

(12) United States Patent
Cho et al.

(10) Patent No.: US 12,785,839 B2
(45) Date of Patent: Nov. 3, 2026

(54) BIDIRECTIONAL WAVELENGTH ACCESS SYSTEM

(71) Applicant: Chunghwa Telecom Co., Ltd., Taoyuan City (TW)

(72) Inventors: Che-Hung Cho, Taoyuan City (TW); Chin-Cheng Hu, Taoyuan City (TW)

(73) Assignee: Chunghwa Telecom Co., Ltd., Taoyuan City (TW)

( * ) Notice: Subject to any disclaimer, the term of this patent is extended or adjusted under 35 U.S.C. 154(b) by 192 days.

(21) Appl. No.: 18/827,841

(22) Filed: Sep. 8, 2024

(65) Prior Publication Data

US 2026/0074817 A1 Mar. 12, 2026

(51) Int. Cl.

| | |
|---|---|
| ***H04J 14/02*** | (2006.01) |
| ***G02B 6/293*** | (2006.01) |
| ***H04B 10/2581*** | (2013.01) |

(52) U.S. Cl.

CPC .......... *H04J 14/0216* (2013.01); *G02B 6/293* (2013.01); *H04B 10/2581* (2013.01)

(58) Field of Classification Search

CPC ........ H01Q 1/243; H01Q 9/0421; H01Q 1/24; H01Q 1/08; H01Q 1/081; H01Q 1/085; H01Q 1/10; H01Q 1/12; H01Q 1/27; H01Q 1/36; H01Q 1/40; H01Q 1/42; H01Q 1/44; H01Q 1/52; H01Q 3/02; H01Q 3/12; H01Q 3/24; H01Q 3/26; H01Q 3/44; H01Q 5/10; H01Q 5/20; H01Q 5/30; H01Q 5/40;

(Continued)

(56) References Cited

U.S. PATENT DOCUMENTS

| | | | | |
|---|---|---|---|---|
| 6,243,177 | B1 * | 6/2001 | Duerksen | G02B 6/2932 398/9 |
| 6,288,812 | B1 * | 9/2001 | Duerksen | H04J 14/0227 398/9 |

(Continued)

FOREIGN PATENT DOCUMENTS

| | | | | |
|---|---|---|---|---|
| CA | 2261918 A1 * | 2/1998 | | H04J 14/0212 |
| CA | 2233327 C * | 6/2003 | | G02B 6/022 |

(Continued)

OTHER PUBLICATIONS

Zhong Pan et al.,"Advanced Optical-Label Routing System Supporting Multicast, Optical TTL, and Multimedia Applications," Oct. 31, 2005, Journal of Lightwave Technology, vol. 23, No. 10, Oct. 2005, pp. 3270-3279.*

(Continued)

*Primary Examiner* — Omar S Ismail
(74) *Attorney, Agent, or Firm* — JCIPRNET

(57) ABSTRACT

A bidirectional wavelength access system includes a bidirectional wavelength access device. The bidirectional wavelength access device includes an optical circulator and a wavelength division filter group. The optical circulator includes a first port, a second port, and a third port. The wavelength division filter group is connected to a main axis optical cable. The wavelength division filter group guides an incident light ray transmitted in the main axis optical cable to the first port of the optical circulator and guides a returning light ray received from the third port of the optical circulator into the main axis optical cable. The incident light ray and the returning light ray both have a first wavelength.

13 Claims, 8 Drawing Sheets

(58) Field of Classification Search
CPC .. H01Q 5/50; H01Q 7/06; H01Q 9/04; H01Q 11/02; H01Q 11/12; H01Q 13/02; H01Q 13/06; H01Q 13/08; H01Q 13/10; H01Q 13/20; H01Q 15/0006; H01Q 15/02; H01Q 15/14; H01Q 15/24; H01Q 19/02; H01Q 19/06; H01Q 19/10; H01Q 19/22; H01Q 19/28; H01Q 21/0006; H01Q 21/06; H01Q 21/0087; H01Q 21/24; H01Q 21/29; H01Q 25/007; A61K 45/06; A61K 31/506; A61P 15/10; C07B 2200/13; C07D 239/36; C07D 403/12; C07D 239/32; G02B 6/293; H04B 10/2581; H04J 14/0216
See application file for complete search history.

(56) References Cited

U.S. PATENT DOCUMENTS 6,333,798 B1 * 12/2001 Allan .................. H04J 14/0216 398/9
6,396,629 B1 * 5/2002 Cao ...................... G02B 6/2746 385/11
6,404,525 B1 * 6/2002 Shimomura ........... H04B 10/03 398/9
6,538,815 B1 * 3/2003 Cao ......................... G02F 1/093 385/11
6,836,588 B1 * 12/2004 Zeng ................ H04B 10/25133 359/332
6,853,488 B1 * 2/2005 Cao ...................... G02B 6/2746 385/11
6,895,091 B1 5/2005 Elliott et al.
7,236,597 B2 6/2007 Elliott et al.
2001/0000131 A1 * 4/2001 Cao ...................... G02B 5/3083 359/489.14
2002/0039213 A1 * 4/2002 Duerksen .............. H04J 14/021 398/67
2002/0054406 A1 * 5/2002 Duerksen ............ H04J 14/0213 398/67
2002/0196495 A1 * 12/2002 Grasso ................ H04J 14/0209 385/24
2005/0111788 A1 * 5/2005 Tsuyama ................ H04B 10/40 385/24
2008/0013950 A1 * 1/2008 Boudreault ......... H04J 14/0216 398/59
2008/0181559 A1 * 7/2008 Corem ...................... G02F 1/31 385/16
2010/0046884 A1 * 2/2010 Presley .................. G02B 6/356 385/17
2013/0101285 A1 * 4/2013 Shar ................... H04B 10/1149 398/127
2016/0033325 A1 * 2/2016 Fusco ................ H04B 10/0795 356/73.1
2016/0061690 A1 * 3/2016 Elkins, II ............... G01M 11/33 356/73.1
2017/0134093 A1 * 5/2017 Ben Ezra ............. G02B 6/4246
2019/0075379 A1 * 3/2019 Sato ................... H04Q 11/0005
2021/0002737 A1 1/2021 Verleene

FOREIGN PATENT DOCUMENTS

CA 2655746 A1 * 2/2008 ......... G02B 6/29395
CN 107688215 A * 2/2018 ........... G02B 6/4246
CN 108501944 A * 9/2018 ............ B60W 30/02
CN 112564793 A * 3/2021 ............. H04B 10/11
CN 214585959 U * 11/2021
JP 2002319905 A * 10/2002
TW 412648 B * 11/2000 ............. G02F 1/093
TW 201705699 2/2017

OTHER PUBLICATIONS

Xiaohua Ye et al., "Novel Polarization-insensitive Loop Circulator with Multiport," Jan. 10, 2005, Proc of SPIE vol. 5623, pp. 469-475.*
Changsu Jun et al., "All-fiber wavelength swept ring laser based on Fabry-Perot filter for optical frequency domain imaging," Oct. 14, 2014, Optics Express,Oct. 20, 2014 , vol. 22, No. 21, pp. 25806-25815.*
Oladeji Akanbi, "Bi-Directional Densewavelength Division Multiplexed Systems for Broadband Access Networks," Nov. 16, 2006, School of Electrical and Computer Engineering Georgia Institute of Technology. Dec 2006, pp. 55-117.*
William Hease et al.,"Bidirectional Electro-Optic Wavelength Conversion in the Quantum Ground State," Nov. 23, 2020, American Physical Society , PRX Quantum 1, 020315 (2020), pp. 020315-1-020315-14.*
Ton Koonen, "Indoor Optical Wireless Systems: Technology, Trends, and Applications," Mar. 1, 2018, Journal of Lightwave Technology, vol. 36, No. 8, Apr. 15, 2018, pp. 1459-1466.*
Cheng-Mu Tsai et al., "Demonstration of N/2 2×2 Optical ross-Connectors in One Pair of N×N yclic-AWGs and Multiple Tunable Fiber Gratings," Sep. 10, 2018, IEEE Photonics Journal, vol. 10, No. 5, Sep. 2018,7203510, pp. 1-10.*

* cited by examiner

BIDIRECTIONAL WAVELENGTH ACCESS SYSTEM

BACKGROUND

Technical Field

The disclosure relates to an optical network element, and in particular, relates to a bidirectional wavelength access system.

Description of Related Art

With the rise of 5G optical network fronthaul wavelength division multiplexing (WDM) networks, low-cost WDM optical networks have become the focus of the market.

Therefore, for a person having ordinary skill in the art, how to design a device that can improve the node access performance of transmission in a 5G mobile WDM network is an important issue.

SUMMARY

Accordingly, the disclosure provides a bidirectional wavelength access system which can be used to solve the foregoing technical problems.

An embodiment of the disclosure provides a bidirectional wavelength access system including a first bidirectional wavelength access device. The first bidirectional wavelength access device includes a first optical circulator and a first wavelength division filter group. The first optical circulator includes a first port, a second port, and a third port. The first wavelength division filter group is connected to a first main axis optical cable. The first wavelength division filter group guides a first incident light ray transmitted in the first main axis optical cable to the first port of the first optical circulator and guides a first returning light ray received from the third port of the first optical circulator into the first main axis optical cable. The first incident light ray and the first returning light ray both have a first wavelength.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
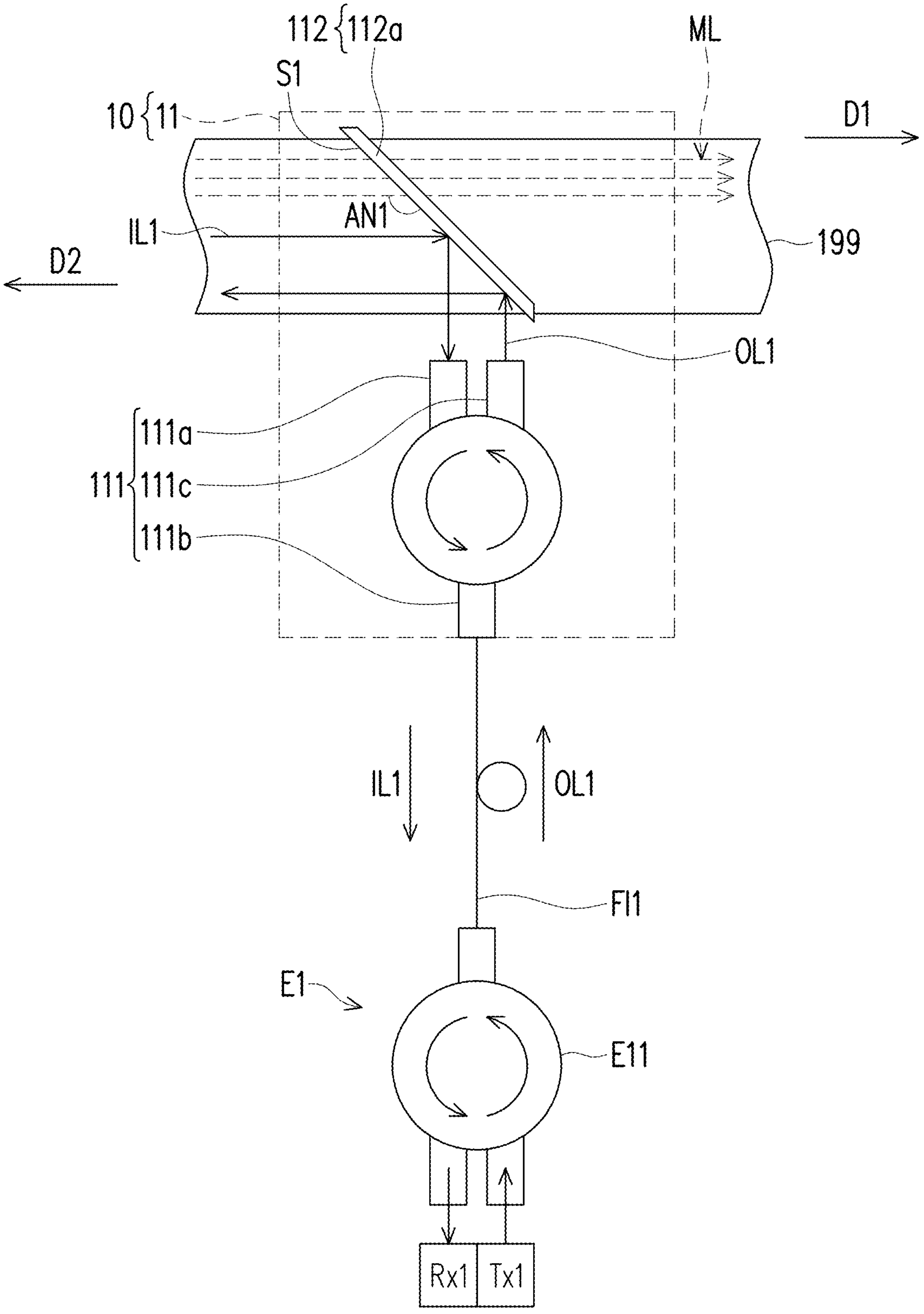
FIG. 1 is a schematic view illustrating a bidirectional wavelength access system according to a first embodiment of the disclosure.

With reference to FIG. 1, which is a schematic view illustrating a bidirectional wavelength access system according to a first embodiment of the disclosure. In FIG. 1, a bidirectional wavelength access system 10 includes a first bidirectional wavelength access device 11 including a first optical circulator 111 and a first wavelength division filter group 112. The first optical circulator 111 includes a first port 111*a*, a second port 111*b*, and a third port 111*c*. The first wavelength division filter group 112 is connected to a first main axis optical cable 199. The first wavelength division filter group 112 guides a first incident light ray IL1 transmitted in the first main axis optical cable 199 to the first port 111*a* of the first optical circulator 111 and guides a first returning light ray OL1 received from the third port 111*c* of the first optical circulator 111 into the first main axis optical cable 199. The first incident light ray IL1 and the first returning light ray OL1 both have a first wavelength (hereinafter referred to as WL1).

In the first embodiment, the second port 111*b* of the first optical circulator 111 is configured to output the first incident light ray IL1 from the first port 111*a* of the first optical circulator 111 and guide the first returning light ray OL1 received from a first external device E1 to the third port 111*c* of the first optical circulator 111.

In the first embodiment, the second port 111*b* of the first optical circulator 111 is connected to the first external device E1 providing the first returning light ray OL1 through a single-core optical cable FI1.

In different embodiments, the first external device E1 may include, for example, an optical circulator E11, a receiver Rx1, and a transmitter Tx1. The optical circulator E11 may receive the first incident light ray IL1 from the second port 111*b* of the first optical circulator 111 through a second port of the optical circulator E11, for example, and then transmits the first incident light ray IL1 to the receiver Rx1 through a third port of the optical circulator E11. In addition, the optical circulator E11 may receive the first returning light ray OL1 from the transmitter Tx1 through a first port of the optical circulator E11, for example, and forwards the first returning light ray OL1 to the second port of the optical circulator E11 through the first port of the optical circulator E11. After that, the second port of the optical circulator E11 may transmit the first returning light ray OL1 to the second port 111*b* of the first optical circulator 111 through the single-core optical cable FI1.

In an embodiment, the first external device E1 may also include only the receiver Rx1 and the transmitter Tx1, and the optical circulator E11 may be connected between the first optical circulator 111 and the first external device E1 as an independent device, for example, but the disclosure is not limited thereto.

In some embodiments, the first external device E1 may be implemented as various communication devices/nodes, such as various base stations, but the disclosure is not limited thereto.

In FIG. 1, the first wavelength division filter group 112 includes a single wavelength division filter 112*a*. An angle AN1 is provided between a light-guiding surface S1 of the wavelength division filter 112*a* and a transmission direction D1 of a main light beam ML transmitted in the first main axis optical cable 199, and the angle AN1 is 135 degrees. In this way, when the first incident light ray IL1 in the main light beam ML is incident on the light-guiding surface S1, the light-guiding surface S1 may guide the first incident light ray IL1 to the first port 111*a* of the first optical circulator 111.

In addition, when the light-guiding surface S1 of the wavelength division filter 112*a* receives the first returning light ray OL1 from the third port 111*c* of the first optical circulator 111, the light-guiding surface S1 may guide the first returning light ray OL1 into the first main axis optical cable 199, so that the first returning light ray OL1 is transmitted in the first main axis optical cable 199.

In the first embodiment, the wavelength division filter 112*a* of the first wavelength division filter group 112 guides only the first incident light ray IL1 with a second wavelength WL2 in the main light beam ML transmitted in the first main axis optical cable 199 to the first port 111*a* of the first optical circulator 111 and bypasses other incident light rays in the main light beam ML that do not have the second wavelength WL2. In FIG. 1, the light-guiding surface S1 of the wavelength division filter 112*a* only guides the first incident light ray IL1 having the second wavelength WL2 in the main light beam ML to the first port 111*a* of the first optical circulator 111. Other incident light rays in the main light beam ML that do not have the second wavelength WL2 directly pass through the wavelength division filter 112*a*, but the disclosure is not limited thereto. From another perspective, the wavelength division filter 112*a* of the first wavelength division filter group 112 may also be understood as acting only on the light ray (e.g., the first incident light ray IL1 and the first returning light ray OL1) with the second wavelength WL2.

In the first embodiment, the first incident light ray IL1 and the first returning light ray OL1 may have opposite transmission directions in the first main axis optical cable 199. In FIG. 1, the transmission direction of the first incident light ray IL1 is, for example, the same as the transmission direction D1 of the main light beam ML, and a transmission direction D2 of the first returning light ray OL1 may be opposite to the transmission direction D1, for example. In the embodiments of the disclosure, since the first incident light ray IL1 and the first returning light ray OL1 have opposite transmission directions in the first main axis optical cable 199, this application scenario may be called "reverse return", but the disclosure is not limited thereto.

In other embodiments, the angle AN1 may also be adaptively adjusted according to the relative positions among the first wavelength division filter group 112, the first main axis optical cable 199, and the first optical circulator 111 and is not limited to the arrangement shown in FIG. 1.

Figure 2:
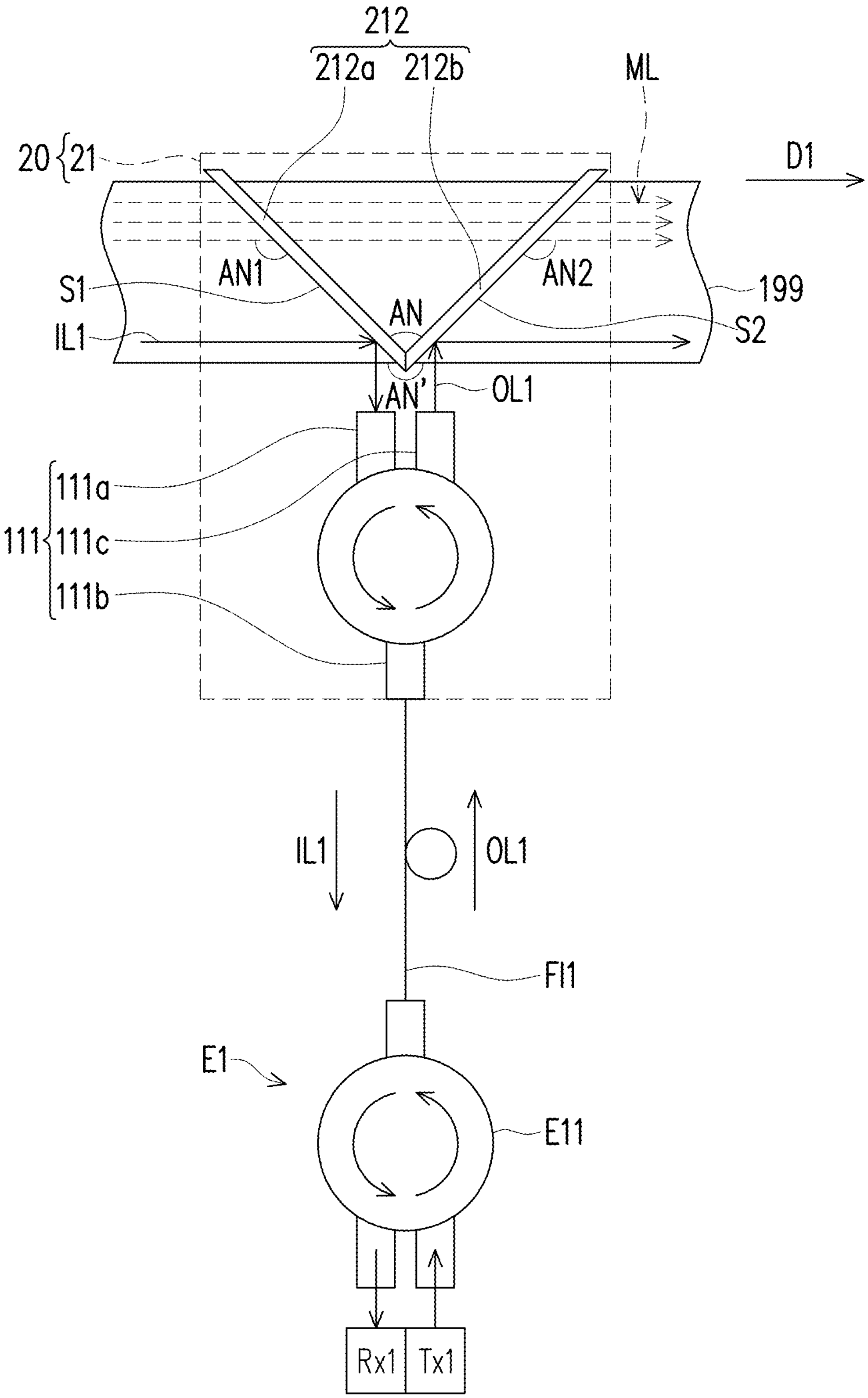
FIG. 2 is a schematic view illustrating a bidirectional wavelength access system according to a second embodiment of the disclosure.

With reference to FIG. 2, which is a schematic view illustrating a bidirectional wavelength access system according to a second embodiment of the disclosure. In FIG. 2, a bidirectional wavelength access system 20 includes a first bidirectional wavelength access device 21 including the first optical circulator 111 and a first wavelength division filter group 212. The first optical circulator 111 includes the first port 111*a*, the second port 111*b*, and the third port 111*c*. The first wavelength division filter group 212 is connected to the first main axis optical cable 199. The first wavelength division filter group 212 guides the first incident light ray IL1 transmitted in the first main axis optical cable 199 to the first port 111*a* of the first optical circulator 111 and guides the first returning light ray OL1 received from the third port 111*c* of the first optical circulator 111 into the first main axis optical cable 199. The first incident light ray IL1 and the first returning light ray OL1 both have the second wavelength WL2.

The second embodiment is different from FIG. 1 in that the first wavelength division filter group 212 in the second embodiment includes not only a wavelength division filter 212*a* but also a wavelength division filter 212*b*. The operation of the wavelength division filter 212*a* is the same as that of the wavelength division filter 112*a* in FIG. 1. In the second embodiment, an angle AN between the wavelength division filters 212*a* and 212*b* may be 90 degrees. Furthermore, the wavelength division filter 212*b* may have a light-guiding surface S2, and an angle AN' between the light guiding surfaces S1 and S2 may be 270 degrees, but the disclosure is not limited thereto.

In FIG. 2, an angle AN2 is provided between the light-guiding surface S2 of the wavelength division filter 212*b* and the transmission direction D1 of the main light beam ML, where the angle AN2 is 135 degrees.

In the second embodiment, the light-guiding surface S1 may be used to guide the first incident light ray IL1 transmitted in the first main axis optical cable 199 to the first port 111*a* of the first optical circulator 111. In addition, the light-guiding surface S2 may be used to receive the first returning light ray OL1 from the third port 111*c* of the first optical circulator 111 and guide the first returning light ray OL1 to the first main axis optical cable 199, so that the first returning light ray OL1 is transmitted in the first main axis optical cable 199.

In the second embodiment, the wavelength division filter 212*a* of the first wavelength division filter group 212 guides only the first incident light ray IL1 with the second wavelength WL2 in the main light beam ML transmitted in the first main axis optical cable 199 to the first port 111*a* of the first optical circulator 111 and bypasses other incident light rays in the main light beam ML that do not have the second wavelength WL2. In FIG. 2, the light-guiding surface S1 of the wavelength division filter 212*a* only guides the first incident light ray IL1 having the second wavelength WL2 in the main light beam ML to the first port 111*a* of the first optical circulator 111. Other incident light rays in the main light beam ML that do not have the second wavelength WL2 directly pass through the wavelength division filter 212*a*, but the disclosure is not limited thereto. From another perspective, the wavelength division filter 212*a* of the first wavelength division filter group 212 may also be understood as acting only on the light ray (e.g., the first incident light ray IL1 and the first returning light ray OL1) with the second wavelength WL2.

In addition, the wavelength division filter 212*b* of the first wavelength division filter group 212 may also be designed to act only on the light ray with the second wavelength WL2. That is, the wavelength division filter 212*b* may also directly allow other light rays in the main light beam ML that do not have the second wavelength WL2 to pass through, but the disclosure is not limited thereto.

In the second embodiment, the first incident light ray IL1 and the first returning light ray OL1 may have the same transmission direction in the first main axis optical cable 199. In FIG. 2, the transmission direction of the first incident light ray IL1 is, for example, the same as the transmission direction D1 of the main light beam ML, and the transmission direction of the first returning light ray OL1 may be the same as the transmission direction D1, for example. In the embodiments of the disclosure, since the first incident light ray IL1 and the first returning light ray OL1 have the same transmission direction in the first main axis optical cable 199, this application scenario may be called "forward return", but the disclosure is not limited thereto.

In other embodiments, the angles shown may also be adaptively adjusted according to the relative positions among the first wavelength division filter group 212, the first main axis optical cable 199, and the first optical circulator 111 and are not limited to the arrangement shown in FIG. 2.

Figure 3:
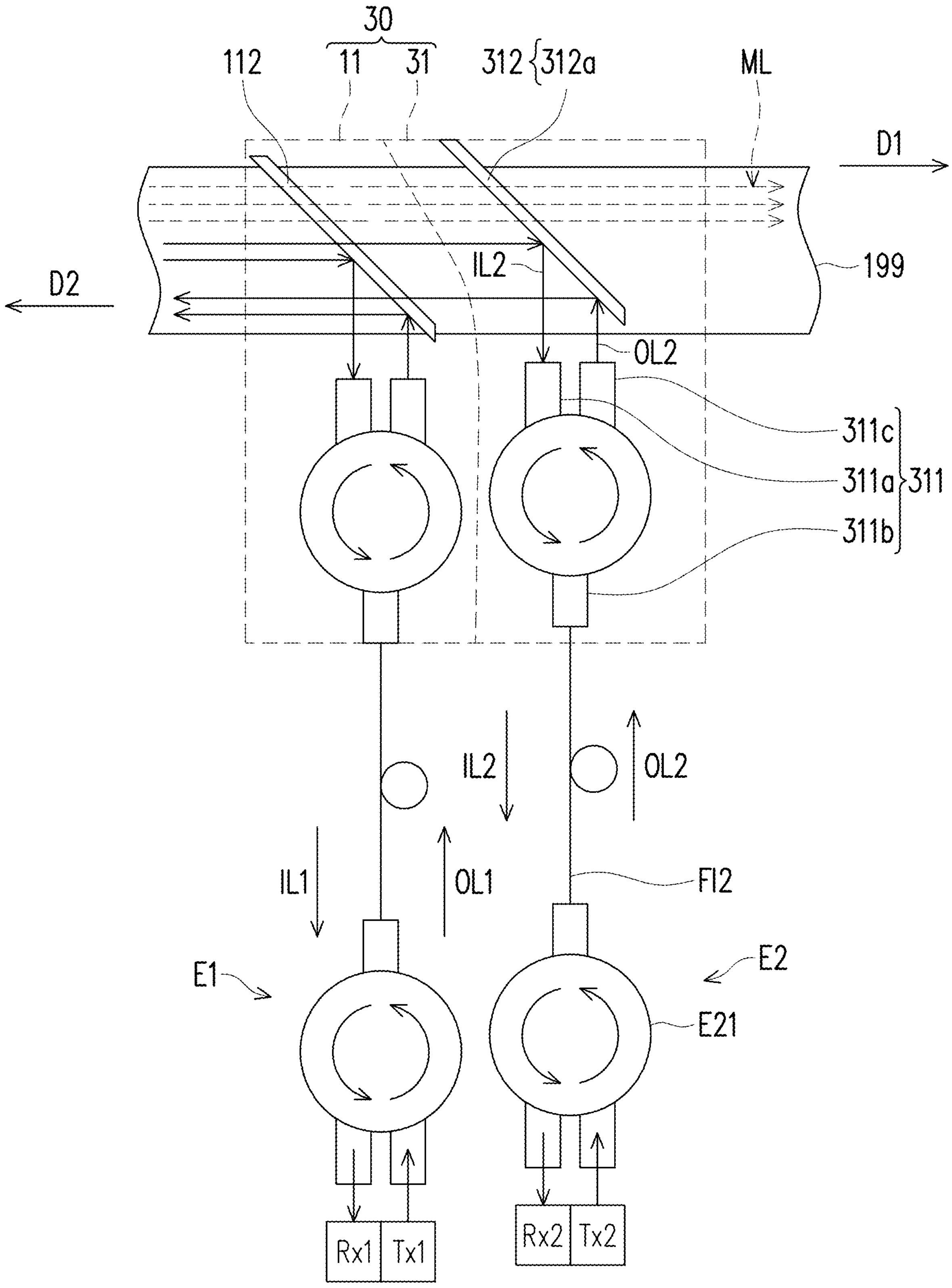
FIG. 3 is a schematic view illustrating a bidirectional wavelength access system according to a third embodiment of the disclosure.

With reference to FIG. 3, which is a schematic view illustrating a bidirectional wavelength access system according to a third embodiment of the disclosure. In FIG. 3, a bidirectional wavelength access system 30 may include a second bidirectional wavelength access device 31 in addition to the first bidirectional wavelength access device 11 in FIG. 1. The relevant details of the first bidirectional wavelength access device 11 may be found in the relevant description of FIG. 1 and thus are not repeated herein.

In the third embodiment, the second bidirectional wavelength access device 31 includes a second optical circulator 311 and a second wavelength division filter group 312. The second optical circulator 311 includes a first port 311*a*, a second port 311*b*, and a third port 311*c*. The second wavelength division filter group 312 is connected to the first main axis optical cable 199. The second wavelength division filter group 312 guides a second incident light ray IL2 transmitted in the first main axis optical cable 199 to the first port 311*a* of the second optical circulator 311 and guides a second returning light ray OL2 received from the third port 311*c* of the second optical circulator 311 into the first main axis optical cable 199. The second incident light ray IL2 and the second returning light ray OL2 both have the second wavelength (hereinafter referred to as WL2).

In the third embodiment, the second port 311*b* of the second optical circulator 311 is configured to output the second incident light ray IL2 from the first port 311*a* of the second optical circulator 311 and guide the second returning light ray OL2 received from a second external device E2 to the third port 311*c* of the second optical circulator 311.

In the third embodiment, the second port 311*b* of the second optical circulator 311 is connected to the second external device E2 providing the second returning light ray OL2 through a single-core optical cable FI2.

In different embodiments, the second external device E2 may include, for example, an optical circulator E21, a receiver Rx2, and a transmitter Tx2. The optical circulator E21 may receive the second incident light ray IL2 from the second port 311*b* of the second optical circulator 311 through a second port of the optical circulator E21, for example, and then transmits the second incident light ray IL2 to the receiver Rx2 through a third port of the optical circulator E21. In addition, the optical circulator E21 may receive the second returning light ray OL2 from the transmitter Tx2 through a first port of the optical circulator E21, for example, and forwards the second returning light ray OL2 to the second port of the optical circulator E21 through the first port of the optical circulator E21. After that, the second port of the optical circulator E21 may transmit the second returning light ray OL2 to the second port 311*b* of the second optical circulator 311 through the single-core optical cable FI2.

In an embodiment, the second external device E2 may also include only the receiver Rx2 and the transmitter Tx2, and the optical circulator E21 may be connected between the second optical circulator 311 and the second external device E2, for example, but the disclosure is not limited thereto.

In some embodiments, the second external device E2 may be implemented as various communication devices/nodes, such as various base stations, but the disclosure is not limited thereto.

In FIG. 3, the second wavelength division filter group 312 includes a single wavelength division filter 312*a*. An angle of 135 degrees is provided between a light-guiding surface of the wavelength division filter and the transmission direction D1 of the main light beam ML transmitted in the first main axis optical cable 199. In this way, when the second incident light ray IL2 in the main light beam ML is incident on the light-guiding surface of the wavelength division filter 312*a*, the light-guiding surface of the wavelength division filter 312*a* may guide the second incident light ray IL2 to the first port 311*a* of the second optical circulator 311.

In addition, when the light-guiding surface of the wavelength division filter 312*a* receives the second returning light ray OL2 from the third port 311*c* of the second optical circulator 311, the light-guiding surface of the wavelength division filter 312*a* may guide the second returning light ray OL2 into the first main axis optical cable 199, so that the second returning light ray OL2 is transmitted in the first main axis optical cable 199.

In the third embodiment, the wavelength division filter 312*a* of the second wavelength division filter group 312 guides only the second incident light ray IL2 with the second wavelength WL2 in the main light beam ML transmitted in the first main axis optical cable 199 to the first port 311*a* of the second optical circulator 311 and bypasses other incident light rays in the main light beam ML that do not have the second wavelength WL2. In FIG. 3, the light-guiding surface of the wavelength division filter 312*a* only guides the second incident light ray IL2 having the second wavelength WL2 in the main light beam ML to the first port 311*a* of the second optical circulator 311. Other incident light rays in the main light beam ML that do not have the second wavelength WL2 directly pass through the wavelength division filter 312*a*, but the disclosure is not limited thereto. From another perspective, the wavelength division filter 312*a* of the second wavelength division filter group 312 may also be understood as acting only on the light ray (e.g., the second incident light ray IL2 and the second returning light ray OL2) with the second wavelength WL2.

In the third embodiment, the second incident light ray IL2 and the second returning light ray OL2 may have opposite transmission directions in the first main axis optical cable 199. In FIG. 3, the transmission direction of the second incident light ray IL2 is, for example, the same as the transmission direction D1 of the main light beam ML, and the transmission direction D2 of the second returning light ray OL2 may be opposite to the transmission direction D1, for example. In other words, the second bidirectional wavelength access device 31 may also be understood as being used in a "reverse return" scenario.

In FIG. 3, the first wavelength division filter group 112 receives the main light beam ML transmitted in the first main axis optical cable 199 before the second wavelength division filter group 312. Since the first wavelength division filter group 112 has guided the first incident light ray IL1 with the first wavelength WL1 to the first port 111*a* of the first optical circulator 111, the main light beam ML received by the second wavelength division filter group 312 shall not include any light ray with the first wavelength WL1. From another perspective, the light ray bypassed by the first wavelength division filter group 112 includes light ray with the second wavelength WL2 (e.g., the second incident light ray IL2).

In addition, since the second bidirectional wavelength access device 31 in FIG. 3 has substantially the same structure as the first bidirectional wavelength access device 11, the bidirectional wavelength access system 30 may also be understood as including two first bidirectional wavelength access devices 11. The two first bidirectional wavelength access devices 11 may successively guide the light rays with corresponding wavelengths in the main light beam ML transmitted in the first main axis optical cable 199 to the corresponding optical circulators, but the disclosure is not limited thereto.

In some embodiments, the second bidirectional wavelength access device 31 in FIG. 3 and the first bidirectional wavelength access device 11 may be implemented as independent devices or may be integrated into the same specific bidirectional wavelength access device.

In other embodiments, the bidirectional wavelength access system 30 may also include more first bidirectional wavelength access devices 11 and/or second bidirectional wavelength access devices 31, and they may operate individually according to the methods mentioned in the relevant descriptions of FIG. 1 and FIG. 3.

Figure 4:
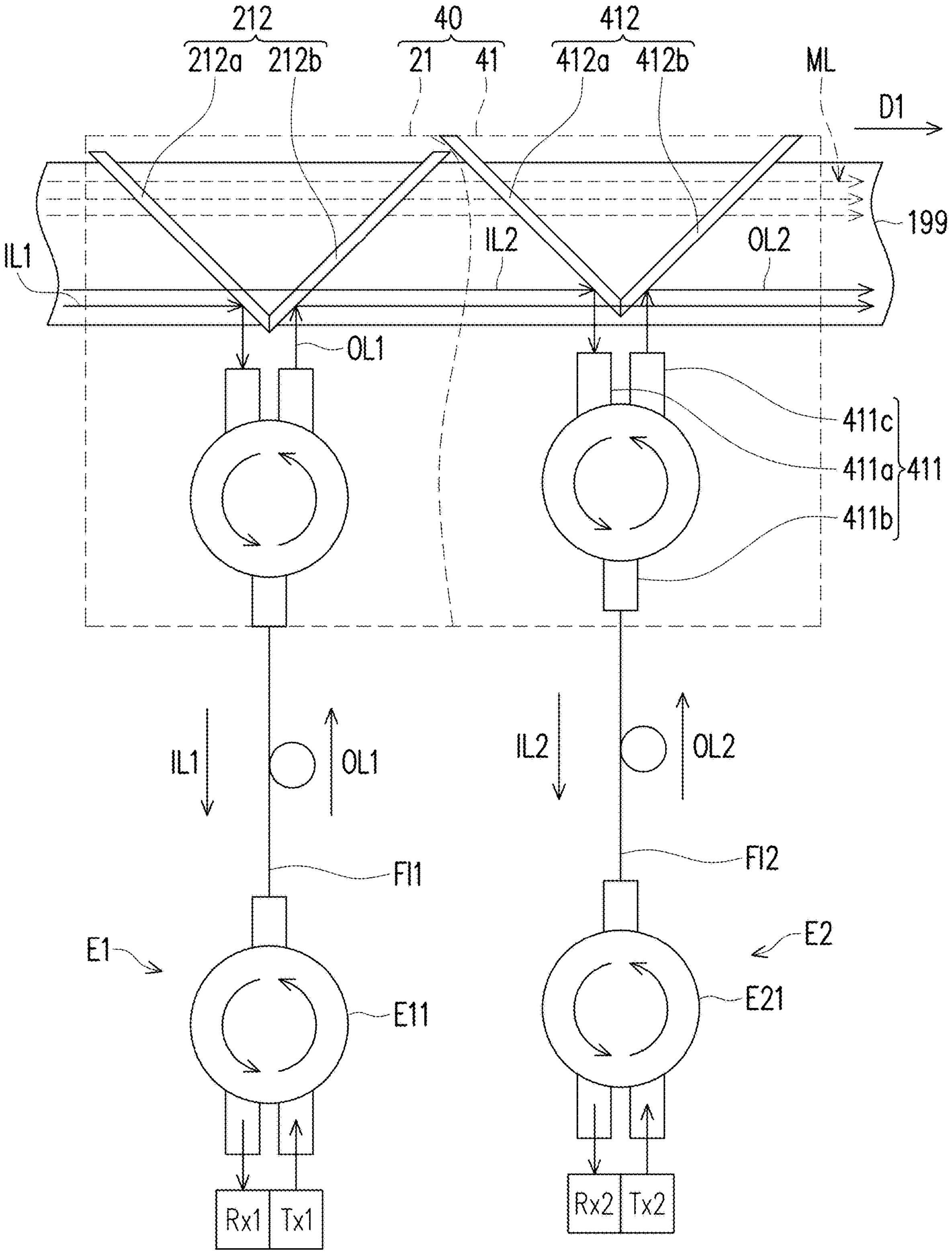
FIG. 4 is a schematic view illustrating a bidirectional wavelength access system according to a fourth embodiment of the disclosure.

With reference to FIG. 4, which is a schematic view illustrating a bidirectional wavelength access system according to a fourth embodiment of the disclosure. In FIG. 4, a bidirectional wavelength access system 40 may include a second bidirectional wavelength access device 41 in addition to the first bidirectional wavelength access device 21 in FIG. 2. The relevant details of the first bidirectional wavelength access device 21 may be found in the relevant description of FIG. 2 and thus are not repeated herein.

In the fourth embodiment, the second bidirectional wavelength access device 41 includes a second optical circulator 411 and a second wavelength division filter group 412. The second optical circulator 411 includes a first port 411*a*, a second port 411*b*, and a third port 411*c*. The second wavelength division filter group 412 is connected to the first main axis optical cable 199. The second wavelength division filter group 412 guides the second incident light ray IL2 transmitted in the first main axis optical cable 199 to the first port 411*a* of the second optical circulator 411 and guides the second returning light ray OL2 received from the third port 411*c* of the second optical circulator 411 into the first main axis optical cable 199. The second incident light ray IL2 and the second returning light ray OL2 both have the second wavelength WL2.

In the fourth embodiment, the second port 411*b* of the second optical circulator 411 is configured to output the second incident light ray IL2 from the first port 411*a* of the second optical circulator 411 and guide the second returning light ray OL2 received from the second external device E2 to the third port 411*c* of the second optical circulator 411.

In the fourth embodiment, the second port 411*b* of the second optical circulator 411 is connected to the second external device E2 providing the second returning light ray OL2 through the single-core optical cable FI2.

In different embodiments, the second external device E2 may include, for example, the optical circulator E21, the receiver Rx2, and the transmitter Tx2. The optical circulator E21 may receive the second incident light ray IL2 from the second port 411*b* of the second optical circulator 411 through the second port of the optical circulator E21, for example, and then transmits the second incident light ray IL2 to the receiver Rx2 through the third port of the optical circulator E21. In addition, the optical circulator E21 may receive the second returning light ray OL2 from the transmitter Tx2 through the first port of the optical circulator E21, for example, and forwards the second returning light ray OL2 to the second port of the optical circulator E21 through the first port of the optical circulator E21. After that, the second port of the optical circulator E21 may transmit the second returning light ray OL2 to the second port 411*b* of the second optical circulator 411 through the single-core optical cable FI2.

In an embodiment, the second external device E2 may also include only the receiver Rx2 and the transmitter Tx2, and the optical circulator E21 may be connected between the second optical circulator 411 and the second external device E2 as an independent device, for example, but the disclosure is not limited thereto.

In some embodiments, the second external device E2 may be implemented as various communication devices/nodes, such as various base stations, but the disclosure is not limited thereto.

In FIG. 4, the second wavelength division filter group 412 includes wavelength division filters 412*a* and 412*b*. The relevant angle settings of the wavelength division filters 412*a* and 412*b* may refer to the settings of the wavelength division filters 212*a* and 212*b* in FIG. 2.

In the fourth embodiment, a light-guiding surface of the wavelength division filter 412*a* may be used to guide the second incident light ray IL2 transmitted in the first main axis optical cable 199 to the first port 411*a* of the second optical circulator 411. In addition, a light-guiding surface of the wavelength division filter 412*b* may be used to receive the second returning light ray OL2 from the third port 411*c* of the second optical circulator 411 and guide the second returning light ray OL2 to the first main axis optical cable 199, so that the second returning light ray OL2 is transmitted in the first main axis optical cable 199.

In the fourth embodiment, the wavelength division filter 412*a* of the second wavelength division filter group 412 guides only the first incident light ray IL1 with the second wavelength WL2 in the main light beam ML transmitted in the first main axis optical cable 199 to the first port 411*a* of the second optical circulator 411 and bypasses other incident light rays in the main light beam ML that do not have the second wavelength WL2. In FIG. 4, the light-guiding surface of the wavelength division filter 412*a* only guides the second incident light ray IL2 having the second wavelength WL2 in the main light beam ML to the first port 411*a* of the second optical circulator 411. Other incident light rays in the main light beam ML that do not have the second wavelength WL2 directly pass through the wavelength division filter 412*a*, but the disclosure is not limited thereto. From another perspective, the wavelength division filter 412*a* of the second wavelength division filter group 412 may also be understood as acting only on the light ray (e.g., the second incident light ray IL2) with the second wavelength WL2.

In addition, the wavelength division filter 412*b* of the second wavelength division filter group 412 may also be designed to act only on the light ray (e.g., the second returning light ray OL2) with the second wavelength WL2. That is, the wavelength division filter 412*b* may also directly allow other light rays in the main light beam ML that do not have the second wavelength WL2 to pass through, but the disclosure is not limited thereto.

In the fourth embodiment, the second incident light ray IL2 and the second returning light ray OL2 may have the same transmission direction in the first main axis optical cable 199. In FIG. 4, the transmission direction of the second incident light ray IL2 is, for example, the same as the transmission direction D1 of the main light beam ML, and the transmission direction of the second returning light ray OL2 is, for example, also the same as the transmission direction D1. In other words, the second bidirectional wavelength access device 41 may also be understood as being used in a "forward return" scenario.

In FIG. 4, the first wavelength division filter group 212 receives the main light beam ML transmitted in the first main axis optical cable 199 before the second wavelength division filter group 412. Since the first wavelength division filter group 212 has guided the first incident light ray IL1 with the first wavelength WL1 to the first port 111*a* of the first optical circulator 111, the main light beam ML received by the second wavelength division filter group 412 shall not include any light ray with the first wavelength WL1. From another perspective, the light ray bypassed by the first wavelength division filter group 212 includes light ray with the second wavelength WL2 (e.g., the second incident light ray IL2).

In addition, since the second bidirectional wavelength access device 41 in FIG. 4 has substantially the same structure as the first bidirectional wavelength access device 21, the bidirectional wavelength access system 30 may also be understood as including two first bidirectional wavelength access devices 21. The two first bidirectional wavelength access devices 21 may successively guide the light rays with corresponding wavelengths in the main light beam ML transmitted in the first main axis optical cable 199 to the corresponding optical circulators, but the disclosure is not limited thereto.

In some embodiments, the second bidirectional wavelength access device 41 in FIG. 4 and the first bidirectional wavelength access device 21 may be implemented as independent devices or may be integrated into the same specific bidirectional wavelength access device.

In other embodiments, the bidirectional wavelength access system 40 may also include more first bidirectional wavelength access devices 21 and/or second bidirectional wavelength access devices 41, and they may operate individually according to the methods mentioned in the relevant descriptions of FIG. 2 and FIG. 4.

Figure 5:
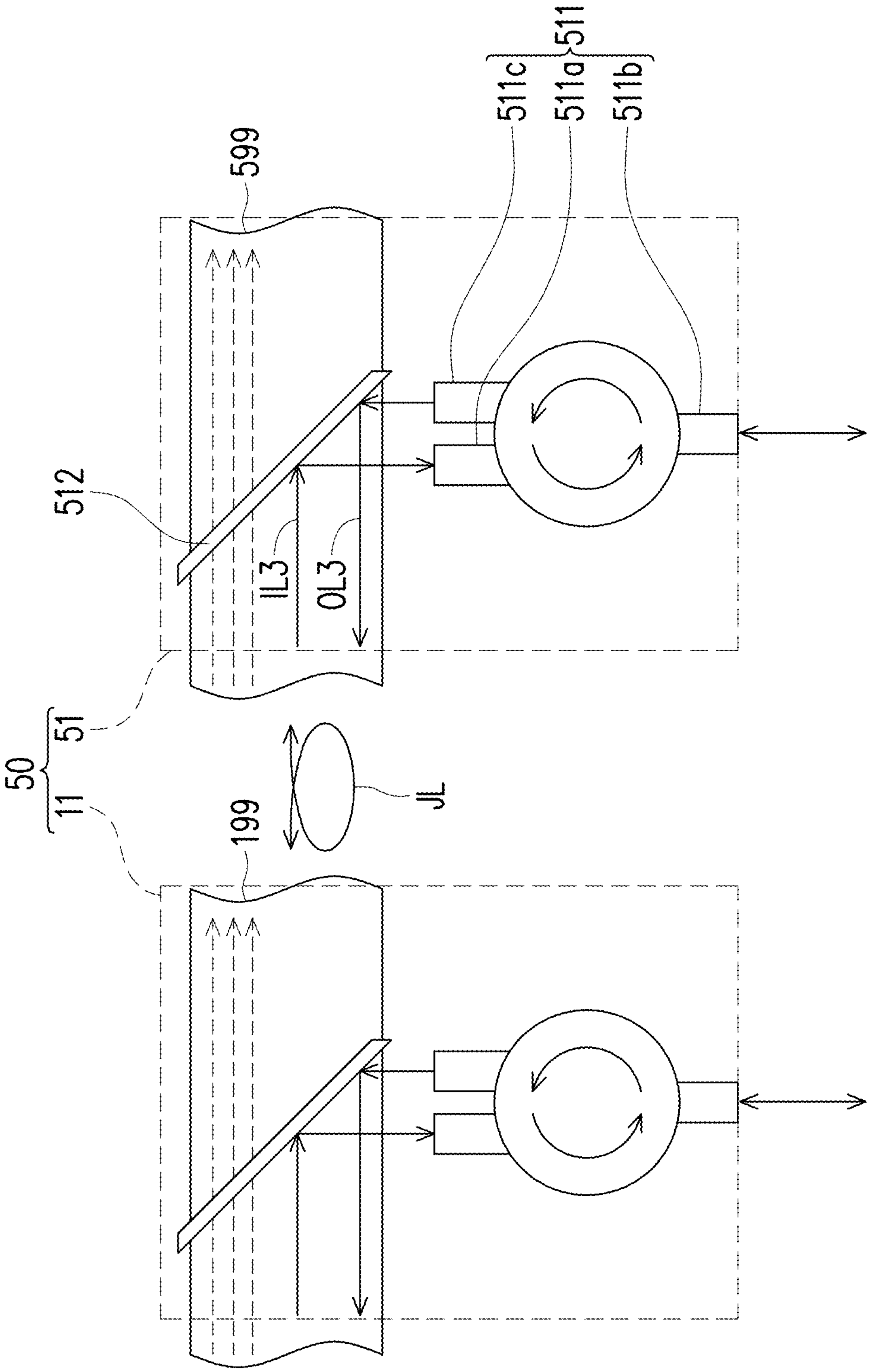
FIG. 5 is a schematic view illustrating a bidirectional wavelength access system according to a fifth embodiment of the disclosure.

With reference to FIG. 5, which is a schematic view illustrating a bidirectional wavelength access system according to a fifth embodiment of the disclosure. In FIG. 5, a bidirectional wavelength access system 50 includes the first bidirectional wavelength access device 11 and a third bidirectional wavelength access device 51. The details of the first bidirectional wavelength access device 11 may be found in the relevant description of FIG. 1 and thus are not repeated herein.

In the fifth embodiment, the third bidirectional wavelength access device 51 includes a third optical circulator 511 and a third wavelength division filter group 512. The third optical circulator 511 includes a first port 511*a*, a second port 511*b*, and a third port 511*c*. The third wavelength division filter group 512 is connected to a second main axis optical cable 599. The third wavelength division filter group 512 guides a third incident light ray IL3 transmitted in the second main axis optical cable 599 to the first port 511*a* of the third optical circulator 511 and guides a third returning light ray OL3 received from the third port 511*c* of the third optical circulator 511 into the second main axis optical cable 599. The third incident light ray IL3 and the third returning light ray OL3 both have a third wavelength (hereinafter referred to as WL3).

In this embodiment, the structures of the third bidirectional wavelength access device 51 and the first bidirectional wavelength access device 11 may be substantially the same. However, the first bidirectional wavelength access device 11 is connected to the first main axis optical cable 199, and the third bidirectional wavelength access device 51 is connected to the second main axis optical cable 599. Therefore, the operation details of the first bidirectional wavelength access device 51 may be found in the relevant description of FIG. 1 and thus are not repeated herein.

In the fifth embodiment, an output end of the first main axis optical cable 199 may connected to an input end of the second main axis optical cable 599 through an optical fiber jumping line JL, and a function similar to the architecture of FIG. 3 may thus be achieved. Further, the architecture of FIG. 3 may be understood as connecting different wavelength access devices in an internal serial manner, while the architecture of FIG. 5 may be understood as connecting different wavelength access devices in an external serial manner. It thus can be seen that the architecture of the embodiments of the disclosure has a certain degree of configuration flexibility.

Figure 6:
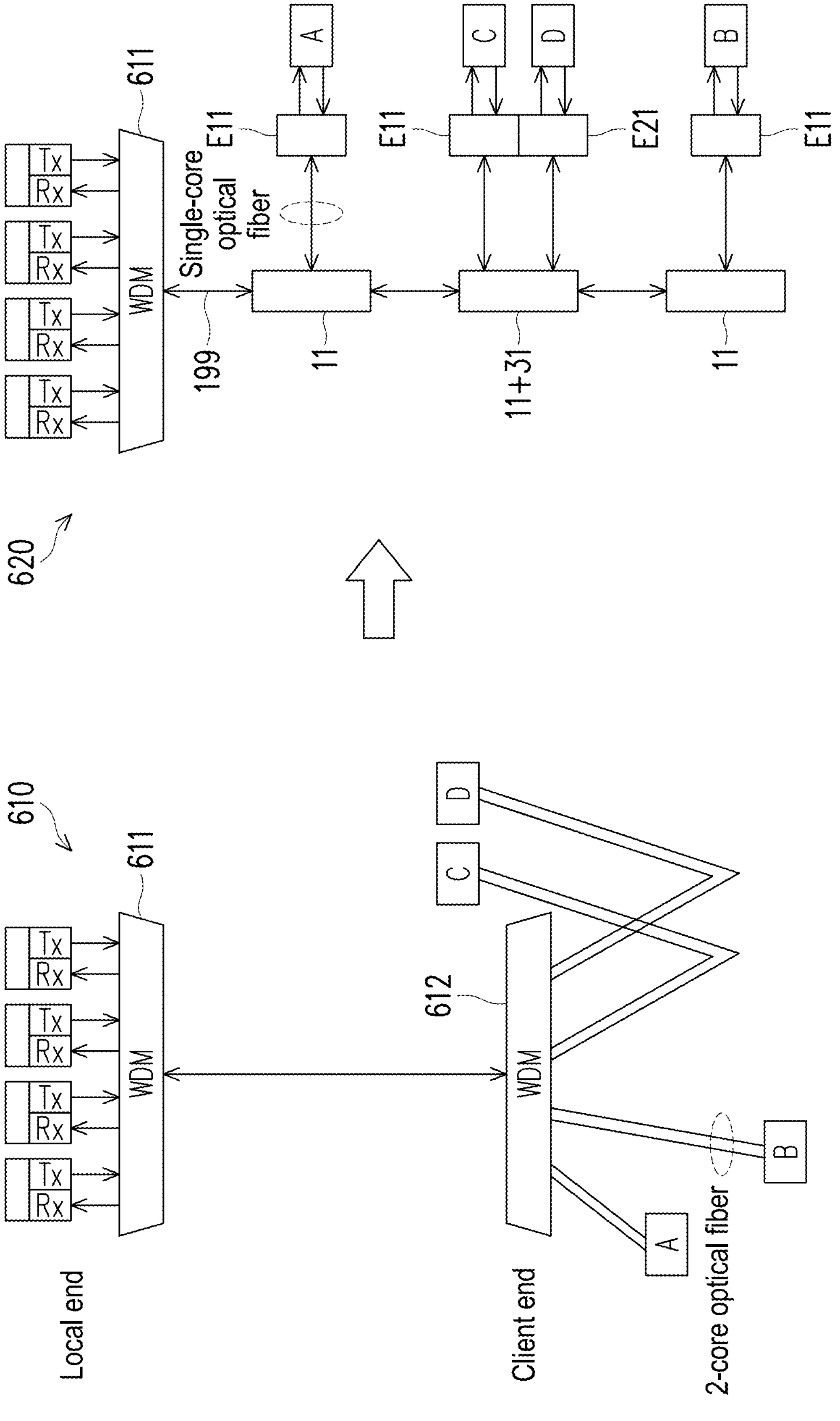
FIG. 6 is an application scenario view illustrated according to a sixth embodiment of the disclosure.

With reference to FIG. 6, which is a diagram illustrating an application scenario according to a sixth embodiment of the disclosure. In FIG. 6, the architecture shown in the left half is a schematic diagram of a conventional optical network architecture 610, and the architecture shown in the right half is a schematic diagram of an optical network architecture 620 after applying the bidirectional wavelength access system of the embodiments of the disclosure.

In the optical network architecture 610, when a local end intends to provide optical signals to a client end, the optical signals with different wavelengths need to be multiplexed by a wavelength division multiplexer (WDM) 611, and the multiplexed optical signals are then sent to a WDM 612 corresponding to the client end (which may be set in an optical splice box or a server-room end). When the WDM 612 of the client end receives the multiplexed optical signals from the WDM 611, the WDM 612 can demultiplex the multiplexed optical signals and transmit the optical signals with different wavelengths to client devices A, B, C, and D through corresponding bidirectional 2-core optical fibers. It thus can be seen that when there are N client devices at the client end, N*2 optical fibers are needed to implement the optical network architecture 610.

In contrast, in the optical network architecture 620 applying the bidirectional wavelength access system of the embodiments of the disclosure (which corresponds to the scenario of "reverse return"), only one bidirectional wavelength access device is needed to guide a light ray (optical signal) with a specific wavelength to the corresponding client device through a single-core optical fiber. Therefore, when there are N client devices at the client end, only N optical fibers are needed to implement the optical network architecture 620.

It should be understood that in the optical network architecture 620, the wavelength division filters in the first bidirectional wavelength access device 11 and/or the second bidirectional wavelength access device 31 corresponding to different client devices may be used to guide light rays with corresponding wavelengths. For instance, assuming that the client device A corresponds to a specific wavelength 1, the wavelength division filter in the first bidirectional wavelength access device 11 corresponding to the client device A may be used to guide the light ray with the wavelength 1 in the first main axis optical cable 199. For another instance, assuming that the client device B corresponds to a specific wavelength 2, the wavelength division filter in the first bidirectional wavelength access device 11 corresponding to the client device B may be used to guide the light ray with the wavelength 2 in the first main axis optical cable 199. In addition, assuming that the client devices C and D respectively correspond to wavelengths 3 and 4, the wavelength division filters in the first bidirectional wavelength access device 11 and the third bidirectional wavelength access device 31 corresponding to the client devices D and D respectively may be used to respectively guide the light rays with the wavelengths 3 and 4 in the first main axis optical cable 199.

It thus can be seen that compared to the conventional optical network architecture 610, in the optical network architecture 620 applying the bidirectional wavelength access system of the embodiments of the disclosure, half of the optical fibers may be saved, so the costs and time of deploying the optical network architecture are effectively reduced.

Figure 7:
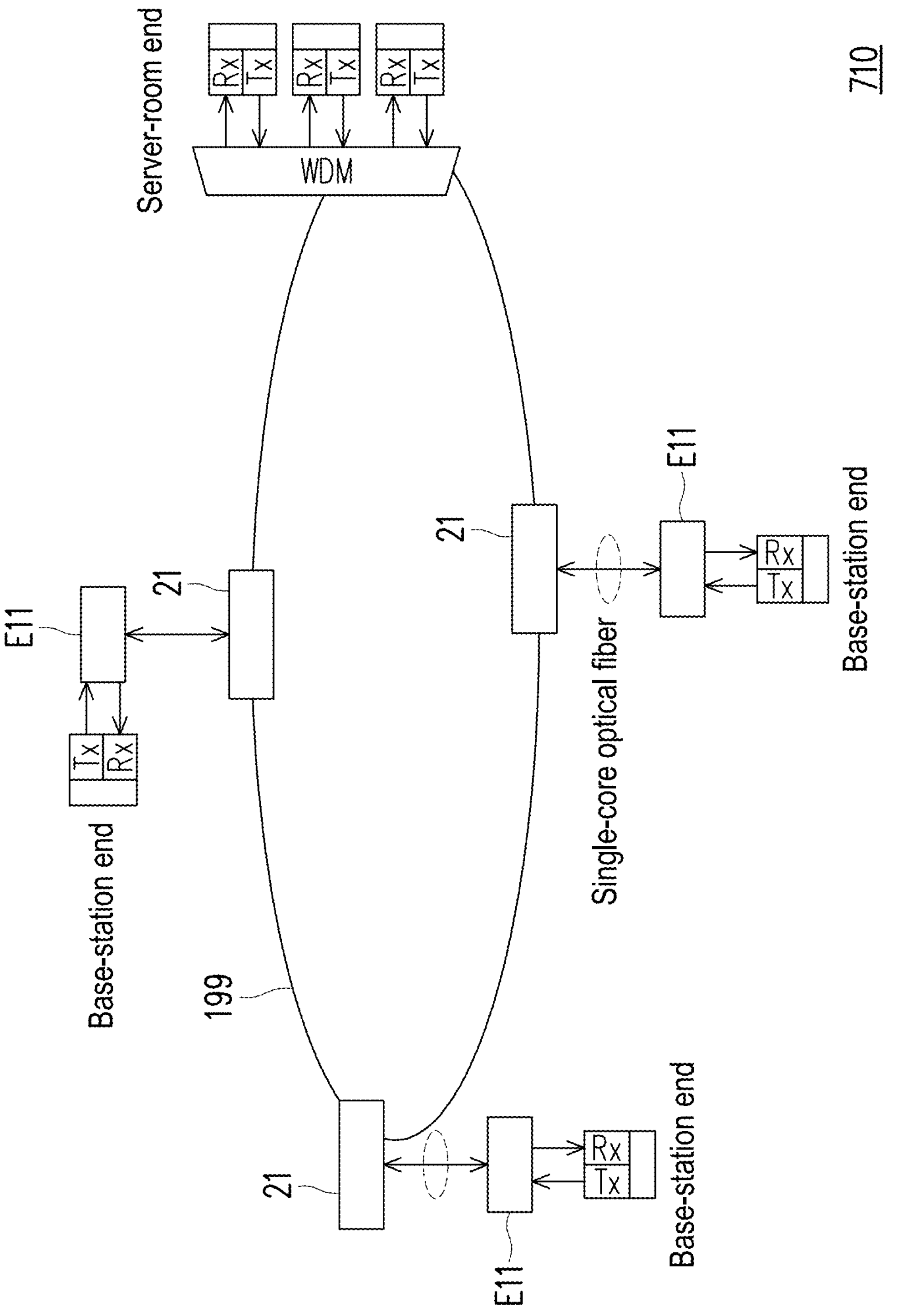
FIG. 7 is an application scenario view illustrated according to a seventh embodiment of the disclosure.

With reference to FIG. 7, which is a diagram illustrating an application scenario according to a seventh embodiment of the disclosure. In FIG. 7, a network architecture diagram 710 shown corresponds to a "forward return" scenario, for example. As can be seen from FIG. 7, since only one bidirectional wavelength access device is needed to guide a light ray (optical signal) with a specific wavelength to a corresponding base station through a single-core optical fiber, when there are N base stations, only N optical fibers are needed at the client end to implement the optical network architecture 710. It thus can be seen that compared to the conventional optical network architecture, in the optical network architecture 710 applying the bidirectional wavelength access system of the embodiments of the disclosure, half of the optical fibers may also be saved, so the costs and time of deploying the optical network architecture are effectively reduced.

Figure 8:
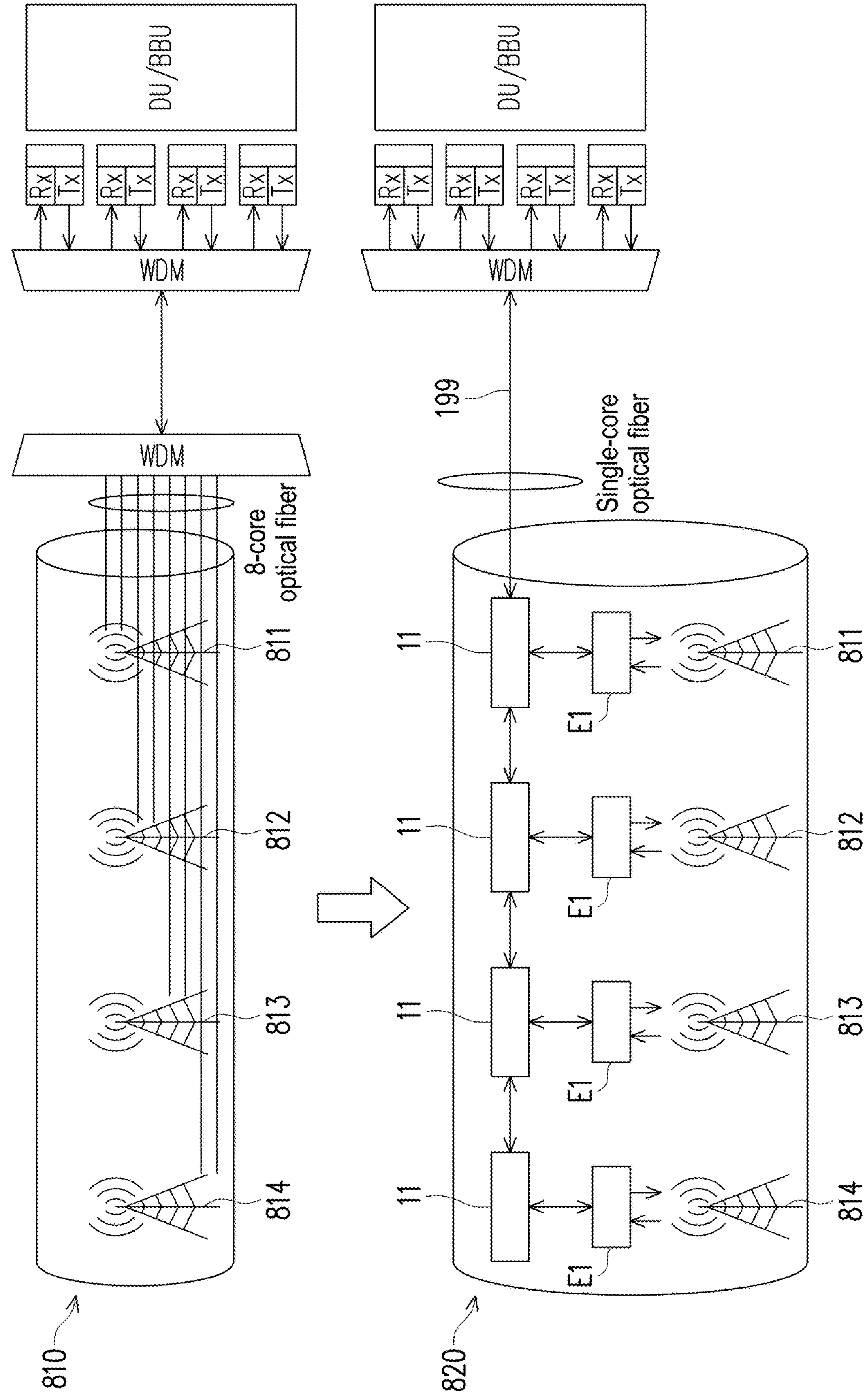
FIG. 8 is an application scenario view illustrated according to an eighth embodiment of the disclosure.

With reference to FIG. 8, which is a diagram illustrating an application scenario according to an eighth embodiment of the disclosure. In FIG. 8, the architecture shown in the upper half is a schematic diagram of a conventional optical network architecture 810, and the architecture shown in the lower half is a schematic diagram of an optical network architecture 820 after applying the bidirectional wavelength access system of the embodiments of the disclosure.

In the optical network architecture 810, when a baseband unit (BBU) and/or a distribute unit (DU) want to provide optical signals to four base stations 811 to 814, the optical signals with different wavelengths need to be multiplexed through the corresponding WDM, and then the multiplexed optical signals are sent to the WDM corresponding to the base stations. After that, the WDM corresponding to the base stations can demultiplex the multiplexed optical signals and transmit the optical signals with different wavelengths to the base stations 811 to 814 through the corresponding bidirectional 2-core optical fibers. Therefore, in the optical network architecture 810, the WDM corresponding to the base stations needs to transmit the optical signals of different wavelengths to the base stations 811 to 814 through an 8-core optical cable.

In contrast, in the optical network architecture 820 applying the bidirectional wavelength access system of the embodiments of the disclosure (which corresponds to the scenario of "reverse return"), only one bidirectional wavelength access device is needed to guide a light ray (optical signal) with a specific wavelength to the corresponding base station through a single-core optical fiber. Therefore, only four optical fibers are needed at the base-station end to implement the optical network architecture 820.

It should be understood that in the optical network architecture 820, the wavelength division filters in the first bidirectional wavelength access devices 11 corresponding to different base stations may be used to guide light rays with corresponding wavelengths. For instance, assuming that the base station 811 corresponds to a specific wavelength 1, the wavelength division filter in the first bidirectional wavelength access device 11 corresponding to the base station 811 may be used to guide the light ray with the wavelength 1 in the first main axis optical cable 199. For another instance, assuming that the base station 812 corresponds to a specific wavelength 2, the wavelength division filter in the first bidirectional wavelength access device 11 corresponding to the base station 812 may be used to guide the light ray with the wavelength 2 in the first main axis optical cable 199.

It thus can be seen that compared to the conventional optical network architecture 810, in the optical network architecture 820 applying the bidirectional wavelength access system of the embodiments of the disclosure, half of the optical fibers may be saved, so the costs and time of deploying the optical network architecture are effectively reduced.

In view of the foregoing, the embodiments of the disclosure have at least the following features. (1) The problem of low-cost distributed multi-node access services over WDM optical networks is solved. (2) Regardless of the optical transmission method, a 1-core optical fiber may be used for bidirectional bandwidth transmission without any obstacles, so that more than half of the number of optical fibers used for transmission are saved, and the costs and time of building new optical cables are effectively reduced. Further, in the embodiments of the disclosure, since the existing optical network layout and optical components may be reused, in addition to saving costs and increasing operational efficiency, the original network and equipment may not be affected when service ports are added, so that plug-and-play is achieved and the problem of temporary optical fiber core shortage on site is solved.

In addition, in the embodiments of the disclosure, since optical passive components are used in the architecture, it has the advantages of no need for power supply and is easy to install, maintain, and operate. Further, in the embodiments of the disclosure, since the architecture may be installed in an outdoor optical splice box or an optical fiber junction box, it is convenient for each node to access.

From another perspective, the purpose of the disclosure is to provide an external single-fiber bidirectional wavelength access device. In relevant application scenarios, maintenance personnel may directly interface the architecture of the embodiments of the disclosure at the WDM optical network access node and may immediately capture the downstream wavelength and store it in the upstream wavelength.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A bidirectional wavelength access system, comprising:

a first bidirectional wavelength access device, comprising:

a first optical circulator comprising a first port, a second port, and a third port; and a first wavelength division filter group connected to a first main axis optical cable, wherein the first wavelength division filter group guides a first incident light ray transmitted in the first main axis optical cable to the first port of the first optical circulator and guides a first returning light ray received from the third port of the first optical circulator into the first main axis optical cable, wherein the first incident light ray and the first returning light ray both have a first wavelength; and a third bidirectional wavelength access device, comprising:

a third optical circulator comprising a first port, a second port, and a third port; and a third wavelength division filter group connected to a second main axis optical cable, wherein the third wavelength division filter group guides a third incident light ray transmitted in the second main axis optical cable to the first port of the third optical circulator and guides a third returning light ray received from the third port of the third optical circulator into the second main axis optical cable, wherein the third incident light ray and the third returning light ray both have a third wavelength, wherein an output end of the first main axis optical cable is connected to an input end of the second main axis optical cable through an optical fiber jumping line.

2. The bidirectional wavelength access system according to claim 1, wherein the second port of the first optical circulator is configured to output the first incident light ray from the first port of the first optical circulator and guide the first returning light ray received from a first external device to the third port of the first optical circulator.

3. The bidirectional wavelength access system according to claim 1, wherein the second port of the first optical circulator is connected to a first external device providing the first returning light ray through a single-core optical cable.

4. The bidirectional wavelength access system according to claim 1, wherein the first wavelength division filter group comprises a single wavelength division filter, an angle is provided between a light-guiding surface of the single wavelength division filter and a transmission direction of a main light beam transmitted in the first main axis optical cable, and the angle is 135 degrees.

5. The bidirectional wavelength access system according to claim 4, wherein the first incident light ray and the first returning light ray have opposite transmission directions in the first main axis optical cable.

6. The bidirectional wavelength access system according to claim 1, wherein the first wavelength division filter group comprises a first wavelength division filter and a second wavelength division filter, a first angle is provided between a first light-guiding surface of the first wavelength division filter and a transmission direction of a main light beam transmitted in the first main axis optical cable, and a second angle is provided between a second light-guiding surface of the second wavelength division filter and the transmission direction of the main light beam, wherein the first angle is 135 degrees, the second angle is 135 degrees, and an angle between the first wavelength division filter and the second wavelength division filter is 90 degrees.

7. The bidirectional wavelength access system according to claim 6, wherein the first incident light ray and the first returning light ray have a same transmission direction in the first main axis optical cable.

8. The bidirectional wavelength access system according to claim 6, wherein an angle between the first light-guiding surface and the second light-guiding surface is 270 degrees.

9. The bidirectional wavelength access system according to claim 1, wherein the first wavelength division filter group only acts on a light ray with the first wavelength.

10. The bidirectional wavelength access system according to claim 1, wherein the first wavelength division filter group guides only the first incident light ray with the first wavelength in a main light beam transmitted in the first main axis optical cable to the first port of the first optical circulator and bypasses other incident light rays in the main light beam that do not have the first wavelength.

11. The bidirectional wavelength access system according to claim 1, further comprising:

a second bidirectional wavelength access device, comprising:

a second optical circulator comprising a first port, a second port, and a third port; and a second wavelength division filter group connected to the first main axis optical cable, wherein the second wavelength division filter group guides a second incident light ray transmitted in the first main axis optical cable to the first port of the second optical circulator and guides a second returning light ray received from the third port of the second optical circulator into the first main axis optical cable, wherein the second incident light ray and the second returning light ray both have a second wavelength.

12. The bidirectional wavelength access system according to claim 11, wherein the first wavelength division filter group receives a main light beam transmitted in the first main axis optical cable before the second wavelength division filter group.

13. The bidirectional wavelength access system according to claim 11, wherein the first bidirectional wavelength access device and the second bidirectional wavelength access device are integrated into a specific bidirectional wavelength access device.

* * * * *